(12) United States Patent
Lim et al.

(10) Patent No.: US 9,374,728 B2
(45) Date of Patent: Jun. 21, 2016

(54) TECHNIQUES FOR MEASURING A LOCATION OF UE

(71) Applicant: LG ELECTRONICS INC., Seoul (KR)

(72) Inventors: Suhwan Lim, Anyang-si (KR);
Sangwook Lee, Anyang-si (KR);
Manyoung Jung, Anyang-si (KR);
Daewon Lee, Anyang-si (KR); Yoonoh Yang, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/732,539

(22) Filed: Jun. 5, 2015

(65) Prior Publication Data

US 2015/0365836 A1 Dec. 17, 2015

Related U.S. Application Data

(63) Continuation of application No. 13/992,918, filed as application No. PCT/KR2011/009493 on Dec. 8, 2011, now Pat. No. 9,084,127.

(60) Provisional application No. 61/422,667, filed on Dec. 14, 2010, provisional application No. 61/480,339, filed on Apr. 28, 2011.

(51) Int. Cl.
*H04W 24/00* (2009.01)
*H04W 24/08* (2009.01)
(Continued)

(52) U.S. Cl.
CPC ............. *H04W 24/08* (2013.01); *G01S 5/10* (2013.01); *H04W 4/02* (2013.01); *H04W 24/00* (2013.01); *H04W 64/00* (2013.01)

(58) Field of Classification Search
CPC ..... H04W 24/00; H04W 64/00; H04W 24/08; H04W 4/02; G01S 5/10

USPC ............. 455/456.1, 456.3, 67.11, 115.1, 456; 370/328, 338

See application file for complete search history.

(56) References Cited

U.S. PATENT DOCUMENTS

| 8,401,570 B2 | 3/2013 | Wigren et al. |
| 2009/0005061 A1 | 1/2009 | Ward et al. |

(Continued)

FOREIGN PATENT DOCUMENTS

| CN | 101888587 | 11/2010 |
| JP | 2008517566 | 5/2008 |

(Continued)

OTHER PUBLICATIONS

PCT International Application No. PCT/KR2011/009493, Written Opinion of the International Searching Authority dated Jul. 31, 2012, 7 pages.

(Continued)

*Primary Examiner* — Cong Tran
(74) *Attorney, Agent, or Firm* — Lee, Hong, Degerman, Kang & Walmey; Jonathan Kang; Michael Monaco

(57) ABSTRACT

The present invention provides a method for measuring a location. The method comprises: receiving, by a User Equipment (UE) and from a serving cell, information on a bandwidth allocated for a positioning reference signal (PRS); receiving, by the User Equipment (UE) and from at least one or more neighbor cells, information on a bandwidth allocated for a PRS; determining whether there is a difference between the bandwidths; and measuring, by the UE and based on a result of the determination a timing difference between PRSs transmitted from the serving cell and the at least one or more neighbor cells.

14 Claims, 12 Drawing Sheets

(51) Int. Cl.
*G01S 5/10* (2006.01)
*H04W 64/00* (2009.01)
*H04W 4/02* (2009.01)

(56) References Cited

U.S. PATENT DOCUMENTS

| | | |
|---|---|---|
| 2010/0239034 A1 | 9/2010 | Lee et al. |
| 2010/0260154 A1 | 10/2010 | Frank et al. |
| 2010/0265842 A1 | 10/2010 | Khandekar et al. |
| 2010/0278141 A1 | 11/2010 | Choi-Grogan et al. |
| 2011/0143770 A1 | 6/2011 | Charbit et al. |
| 2011/0149903 A1 | 6/2011 | Krishnamurthy et al. |
| 2011/0201332 A1 | 8/2011 | Siomina et al. |
| 2012/0040685 A1 | 2/2012 | Escolar-Piedras et al. |
| 2013/0040673 A1 | 2/2013 | Siomina et al. |
| 2013/0260793 A1 | 10/2013 | Lim et al. |

FOREIGN PATENT DOCUMENTS

| | | |
|---|---|---|
| JP | 2010518687 | 5/2010 |
| JP | 2012518965 | 8/2012 |
| JP | 2012523738 | 10/2012 |
| JP | 2012525068 | 10/2012 |
| JP | 2012530394 | 11/2012 |
| JP | 2013502179 | 1/2013 |
| JP | 2013520922 | 6/2013 |
| JP | 2013536616 | 9/2013 |
| JP | 5411351 | 2/2014 |
| JP | 2014503799 | 2/2014 |
| WO | 2010117220 | 10/2010 |
| WO | 2010126419 | 11/2010 |

OTHER PUBLICATIONS

The State Intellectual Property Office of the People's Republic of China Application Serial No. 201180060291.8, Office Action dated Nov. 4, 2015, 5 pages.

(a)

(b)

TECHNIQUES FOR MEASURING A LOCATION OF UE

CROSS-REFERENCE TO RELATED APPLICATIONS

This application is a continuation of U.S. patent application Ser. No. 13/992,918, filed on Jun. 10, 2013, now U.S. Pat. No. 9,084,127, which is the National Stage filing under 35 U.S.C. 371 of International Application No. PCT/KR2011/009493, filed on Dec. 8, 2011, which claims the benefit of U.S. Provisional Application No. 61/422,667, filed on Dec. 14, 2010, and U.S. Provisional Application No. 61/480,339, filed on Apr. 28, 2011, the contents of which are all hereby incorporated by reference herein in their entirety.

TECHNICAL FIELD

This specification relates to a location measurement.

BACKGROUND ART

Second generation (2G) mobile communication refers to transmission and reception of voice into digital and is represented by Code Division Multiple Access (CDMA), Global System for Mobile communication (GSM) and the like. General Packet Radio Service (GPRS) was evolved from the GSM. The GPRS is a technology for providing a packet switched data service based on the GSP system.

Third Generation (3G) mobile communication refers to transmission and reception of image and data as well as voice (audio). Third Generation Partnership Project (3GPP) has developed a mobile communication system (i.e., International Mobile Telecommunications (IMT-2000)), and adapted Wideband-CDMA (WCDMA) as Radio Access Technology (RAT). The IMT-200 and, the RAT, for example, the WCDMA are called as Universal Mobile Telecommunication System (UMTS) in Europe. Here, UTRAN is an abbreviation of UMTS Terrestrial Radio Access Network.

Meanwhile, the third generation mobile communication is evolving to the fourth generation (4G) mobile communication.

As the 4G mobile communication technologies, a Long-Term Evolution Network (LTE) whose standardization is being carried on in 3GPP and IEEE 802.16 whose standardization is being carried on in IEEE have been introduced. The LTE uses a term 'Evolved-UTRAN (E-UTRAN).'

The 4G mobile communication technology has employed Orthogonal Frequency Division Multiplexing (OFDM)/Orthogonal Frequency Division Multiple Access (OFDMA). The OFDM uses a plurality of orthogonal subcarriers. The OFDM uses an orthogonal property between Inverse Fast Fourier Transform (IFFT) and Fast Fourier Transform (FFT). A transmitter performs the IFFT for data and transmits the data. A receiver performs the FFT for a received signal to recover original data. The transmitter uses the IFFT for concatenating a plurality of subcarriers, and the receiver uses the corresponding FFT to segment the plurality of subcarriers.

Meanwhile, the 3G or 4G mobile communication system has a function part for calculating the position (or location) of a terminal to provide a location service that provides the location of the terminal.

Currently, there are several methods for calculating the location of the terminal, including a cell-ID method for transferring an ID of a cell to which a mobile terminal belongs, a method for calculating the location of a terminal through triangulation by measuring time taken for radio signals to reach each base station from the terminal, and a method of using a satellite.

In the cell ID based (i.e. cell coverage) method, a position of an UE is estimated with the knowledge of its serving base station (i.e., a serving Node B). The information about the serving Node B and cell may be obtained during a paging procedure, a locating area update procedure, a cell update procedure, an URA update procedure, or a routing area update procedure The cell coverage based positioning information can be indicated as the Cell Identity of the used cell, the Service Area Identity or as the geographical co-ordinates of a position related to the serving cell. The position information includes a QoS estimate (e.g. regarding achieved accuracy) and, if available, the positioning method (or the list of the methods) used to obtain the position estimate.

When geographical co-ordinates are used as the position information, the estimated position of the UE can be a fixed geographical position within the serving cell (e.g. position of the serving Node B), the geographical centre of the serving cell coverage area, or some other fixed position within the cell coverage area. The geographical position can also be obtained by combining information on the cell specific fixed geographical position with some other available information, such as the signal RTT in FDD or Rx Timing deviation measurement and knowledge of the UE timing advance, in TDD.

Meanwhile, for the method of using the satellite, UE has to be equipped with radio receivers capable of receiving GNSS signals. Indeed, examples of GNSS include a GPS (Global Positioning System) and Galileo. In this concept, different GNSS (e.g. GPS, Galileo) can be used separately or in combination to perform the location of a UE.

Also, the method using a triangulation technique may be divided into two type techniques. The one is a U-TDOA positioning method and the another is an OTDOA-IPDL (observed time difference of arrival with network adjustable idle periods in down link) method.

First, The U-TDOA positioning method is based on network measurements of the Time Of Arrival (TOA) of a known signal sent from the UE and received at four or more LMUs. The method requires LMUs in the geographic vicinity of the UE to be positioned to accurately measure the TOA of the bursts. Since the geographical coordinates of the measurement units are known, the UE position can be calculated via hyperbolic trilateration. This method will work with existing UE without any modification. In most cases the UEs deeply inside the cell coverage radius does not need to receive signals from other cells. Only when the UE moves to cell coverage edge, it needs to listen to signals from other cells and possibly handover to other cells. This is contrary to the UE location acquisition procedure, where the UE may need to listen to more than 1 cell regardless of UE geographical position.

Second, The OTDOA-IPDL (observed time difference of arrival with network adjustable idle periods in down link) method involves measurements made by the UE of the frame timing (e.g. system frame number ? to system frame number observed time difference)

FIG. 1

FIG. 1 illustrates an exemplary OTDOA method.

Referring FIG. 1, the OTDOA-IPDL (observed time difference of arrival with network adjustable idle periods in down link) method involves measurements made by the UE of the frame timing (e.g. system frame number ? to system frame number observed time difference). These measures are used in the network and the position of the UE is calculated. The simplest case of OTDOA-IPDL is without idle periods.

In this case the method can be referred to as simply OTDOA. The Node B may provide idle periods in the downlink, in order to potentially improve the hearability of neighboring Node Bs. The support of these idle periods in the UE is optional.

As such, in the OTDOA technique, the UE has to measure the timing difference. But, if bandwidths allocated by each cell are different each other, the UE suffers from measuring the timing difference.

DISCLOSURE OF INVENTION

Solution to Problem

Therefore, an aspect of this specification is to address such drawbacks. That is, an aspect of this specification is to provide a solution for solving the problem that bandwidths allocated by each cell are different each other.

In more detail, the solution may be to allow the UE to measure the timing difference in a situation where bandwidths allocated by each cell are different each other. Also, the solution may be to allow each cell to sync it's bandwidth with other cell.

To achieve these and other advantages and in accordance with the purpose of the present invention, as embodied and broadly described herein, there is provided a method for measuring a location. The method comprises: receiving, by a User Equipment (UE) and from a serving cell, information on a bandwidth allocated for a positioning reference signal (PRS); receiving, by the User Equipment (UE) and from at least one or more neighbor cells, information on a bandwidth allocated for a PRS; determining whether there is a difference between the bandwidths; and measuring, by the UE and based on a result of the determination a timing difference between PRSs transmitted from the serving cell and the at least one or more neighbor cells.

The bandwidths may have a relationship based on intra-frequency.

The measurement may include: If there is the difference, selecting the biggest bandwidth among the bandwidths; setting, based on the biggest bandwidth, at least one parameter for measuring the timing difference between PRSs; and measuring the timing difference between PRSs according to the parameter. Here, The parameter includes at least one of: a first parameter related to an accuracy with respect to the measurement; and a second parameter related to the number of sub-frames available for the measurement.

Alternatively, the measurement may include: If there is the difference, transmitting a request message for requesting a gap between the PRS of the first base station and the PRS of the neighbor base station.

During the gap, the UE may not receive any data from the first station.

Alternatively, the measurement may include: If there is the difference, selecting the smallest bandwidth among the bandwidths; setting, based on the smallest bandwidth, at least one parameter for measuring the timing difference between PRSs; and measuring the timing difference between PRSs according to the parameter.

Preferably, n the selection step, if the first base station is not a reference cell, the smallest bandwidth may be selected.

The measurement may further include: transmitting information on the set parameter to the first base station.

To achieve those aspects of this specification, there is provided a method for measuring a location performed by a first base station. The method may include: receiving, by the first base station and from at least one or more neighbor base stations, information on a bandwidth allocated for a positioning reference signal of the neighbor base station; determining whether there is a difference between the bandwidth of the neighbor base station and a bandwidth allocated for a PRS of the first base station; and if there is a difference, performing a procedure such that the bandwidths are equal each other.

The procedure may include transmitting a control signal for requesting the neighbor base station to adjust the bandwidth thereby to be equal to the bandwidth of the first base station.

Alternatively, the procedure may include adjusting the bandwidth of the first base station thereby to be equal to the bandwidth of the neighbor base station.

To achieve those aspects of this specification, there is provided a User Equipment. The UE may comprise: a transceiver configured to receive, from a serving cell, information on a bandwidth allocated for a positioning reference signal (PRS) and receive, from at least one or more neighbor cells, information on a bandwidth allocated for a PRS; and a controller configured to determine whether there is a difference between the bandwidths and control the transceiver to measure, based on a result of the determination, a timing difference between PRSs transmitted from the serving cell and the at least one or more neighbor cells.

To achieve those aspects of this specification, there is provided a base station. The base station may comprise a transceiver configured to receive, from at least one or more neighbor base stations, information on a bandwidth allocated for a positioning reference signal of the neighbor base station; and a controller cooperating with the transceiver and configured to determine whether there is a difference between the bandwidth of the neighbor base station and a bandwidth allocated for a PRS of the first base station, If there is a difference, the controller performs a procedure such that the bandwidths are equal each other.

MODE FOR THE INVENTION

Figure 1:
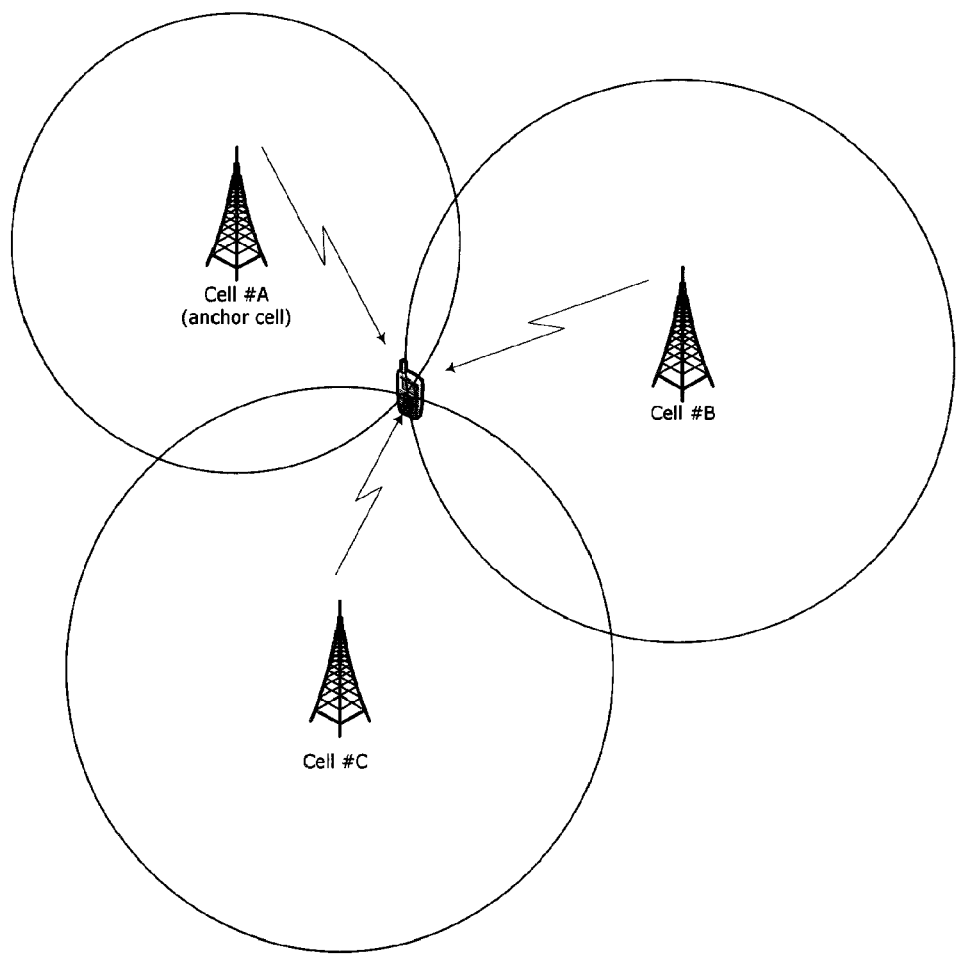
FIG. 1 illustrates an exemplary OTDOA method.

This specification is applied, but not limited, to a measurement technique of the User Equipment's location. This specification may be applicable to any communication system and method to which the technical scope of this specification can be applied.

Technical terms used in this specification are used to merely illustrate specific embodiments, and should be understood that they are not intended to limit the present disclosure. As far as not being defined differently, all terms used herein including technical or scientific terms may have the same meaning as those generally understood by an ordinary person skilled in the art to which the present disclosure belongs to, and should not be construed in an excessively comprehensive meaning or an excessively restricted meaning. In addition, if a technical term used in the description of the present disclosure is an erroneous term that fails to clearly express the idea of the present disclosure, it should be replaced by a technical term that can be properly understood by the skilled person in the art. In addition, general terms used in the description of the present disclosure should be construed according to definitions in dictionaries or according to its front or rear context, and should not be construed to have an excessively restrained meaning.

A singular representation may include a plural representation as far as it represents a definitely different meaning from the context. Terms 'include' or 'has' used herein should be understood that they are intended to indicate an existence of several components or several steps, disclosed in the specification, and it may also be understood that part of the components or steps may not be included or additional components or steps may further be included.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

It will be understood that when an element is referred to as being "connected with" another element, the element can be directly connected with the other element or intervening elements may also be present. In contrast, when an element is referred to as being "directly connected with" another element, there are no intervening elements present.

Embodiments of the present invention will be described below in detail with reference to the accompanying drawings where those components are rendered the same reference number that are the same or are in correspondence, regardless of the figure number, and redundant explanations are omitted. In describing the present invention, if a detailed explanation for a related known function or construction is considered to unnecessarily divert the gist of the present invention, such explanation has been omitted but would be understood by those skilled in the art. The accompanying drawings are used to help easily understood the technical idea of the present invention and it should be understood that the idea of the present invention is not limited by the accompanying drawings. The idea of the present invention should be construed to extend to any alterations, equivalents and substitutes besides the accompanying drawings.

The term 'terminal' is used herein, but the terminal may be replaced with other terms, such as User Equipment (UE), Mobile Equipment (ME), Mobile Station (MS) and the like. Also, the terminal may be a type of portable equipment, such as a cellular phone, PDA, a smart phone, a notebook and the like, or a type of fixed equipment, such as PC, vehicle-mounted device and the like.

Before description of the present invention with reference to the accompanying drawings, the techniques explained in the specification of the present invention will be briefly described to help understanding of the present invention.

One example embodiment of the present invention uses a 3GPP standard based OTDOA technique in which a user equipment (UE) receives positioning reference signals (PRSs) transmitted from plural cells using the same E-UTRA Absolute Radio Frequency Channel Number (EARFCN) and the UE measures a Reference Signal Timing difference (RSTD). As such, the one example embodiment of the present invention provides a technique for increasing an accuracy of the measurement of RSTD.

Requirements of the accuracy are defined in 3GPP standard document TS36.133. In more detail, the documents describes that the measurement satisfies the accuracy according to a transmission bandwidth allocated for the PRS by a neighbor cell. Here, a bandwidth allocated for a channel of PRS is independent from a bandwidth in which the PRS itself is transmitted. Accordingly, after acquiring information on the bandwidth allocated for the channel of PRS by the target neighbor cell, the UE receives the PRSs during the channel, calculates the RSTD between a PRS from a serving cell and a PRS from a target neighbor cell and then transmits information the calculated RSTD.

But, the standard document ideally assumes that the serving cell and the neighbor cell allocate the same bandwidth for the PRS. But, the bandwidth allocated by the serving cell may be different from the bandwidth allocated by the neighbor cell. In this case, since the UE merely considers only the bandwidth of the serving cell, but does not consider the bandwidth of the neighbor cell using the same EARFCN transmit, the accuracy is degraded and it is hard to satisfy the requirement.

Therefore, the one example embodiment of the present invention provides a solution to satisfy the accuracy of the measurement even when the bandwidths are different each other.

Now, the exemplary embodiments of the present invention will now be described in detail with reference to the accompanying drawings.

FIG. 2 & FIG. 3

Figure 2:
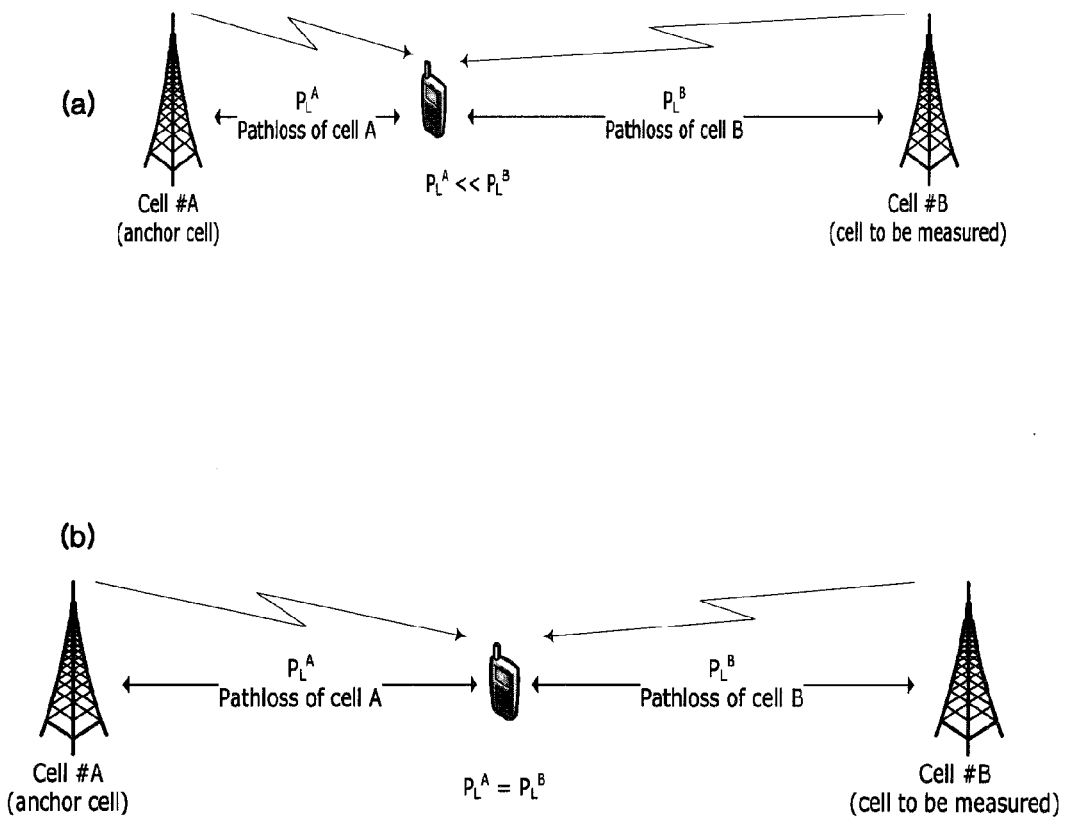
FIG. 2 illustrates one example scenario for detection of positioning RS in OTDOA method.
Figure 3:
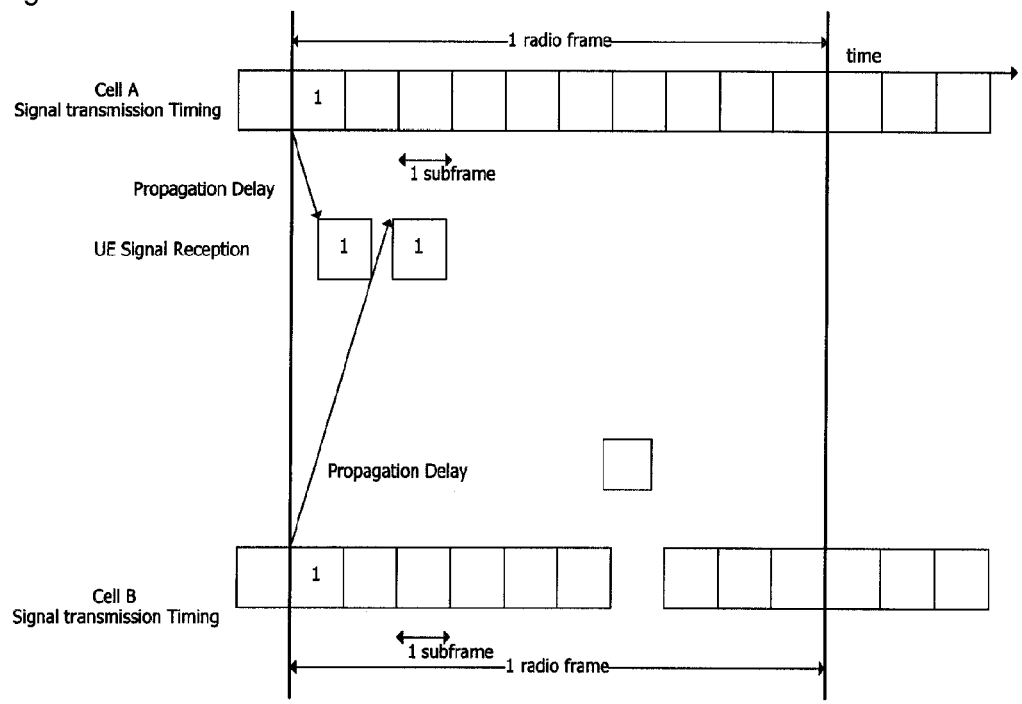
FIG. 3 illustrates one example of a propagation delay from cell A and B.

FIG. 2 illustrates one example scenario for detection of positioning RS in OTDOA method. And, FIG. 3 illustrates one example of a propagation delay from cell A and B.

Assuming the UE is trying to receive certain signals from a target cell, when the UE is connected to a serving cell, there can be two possible scenarios.

Referring FIG. 2(a), the first scenario is where the pathloss of the signal from cell A, which is the serving (anchor) cell is smaller than the pathloss of the signal from cell B, which is the target cell.

Referring FIG. 2(b), the second scenario is where the pathloss of the signal from cell A is similar to the pathloss of the signal from cell B.

In the second scenario the received signal from both cell are being received at the UE in similar amplitudes and if the reception of the signal to be measured from cell B has enough energy than the UE can detect the signal and take needed measurements.

In the first scenario the received signal from cell B will come into the UE much smaller compared to signal received from cell A. In the UE signal amplifying chain called the Automatic Gain Control (AGC) will amplify the received total signal to be fitted into the dynamic range of the Analog to Digital Converter (ADC). If the received signal from cell A is larger than the signal from cell B, than the received total signal will be in fact similar to signal from cell A. Since the AGC only takes into account the total received signal when adjusting the amplifier gains, it might be possible that the received signal from cell B to be lost within the quantization errors in the ADC. So in the first scenario no matter how well the measurement signal sequence was designed, it would be very likely that the UE cannot detect the signal sequence from cell B.

To overcome possible scenarios such as the first scenario mentioned, the serving cell can configure idle periods or signal non-transmitting durations. This will effectively kill the signal from cell A and allow the AGC to adapt to the signal source from cell B thus allowing adequate ADC for received signal from cell B.

When signal is being transmitted through space (air), there is signal propagation delays involved. For example even if two signals are transmitted in the same time instant depending on the position of the signal reception the signals from two different transmission points can be received in different times. This is depicted as an example in FIG. 3, where the UE is located further away from Cell B than Cell A.

So regardless of whether or not the deployed cells are synchronized, the signals from different cells can be received at different timings. For a system which targets the maximum cell radius as 100 km, the maximum propagation delay which could occur from the UE side would be approximately 100 [km]/300000 [km/s] s=0.334 ms (micro seconds). For synchronously deployed cells the maximum signal deviation would be ±0.334 ms at the receiver side. For asynchronously deployed cells the transmission signal at the eNB may already be out of synchronization. From the subframe point of view the maximum deviance between two cells is ±0.5 ms (or half of a subframe). This is because if the subframe timing differences between 2 cells relative to two distinct reference subframe are larger than 0.5 ms, than the reference subframe could be redefined so that the relative time difference is always smaller or equal to ±0.5 ms. Of course this is assuming that the subframe length is equal to 1 ms and that all transmissions and measurements are done by subframe by subframe basis.

FIG. 4 & FIG. 5

Figure 4:
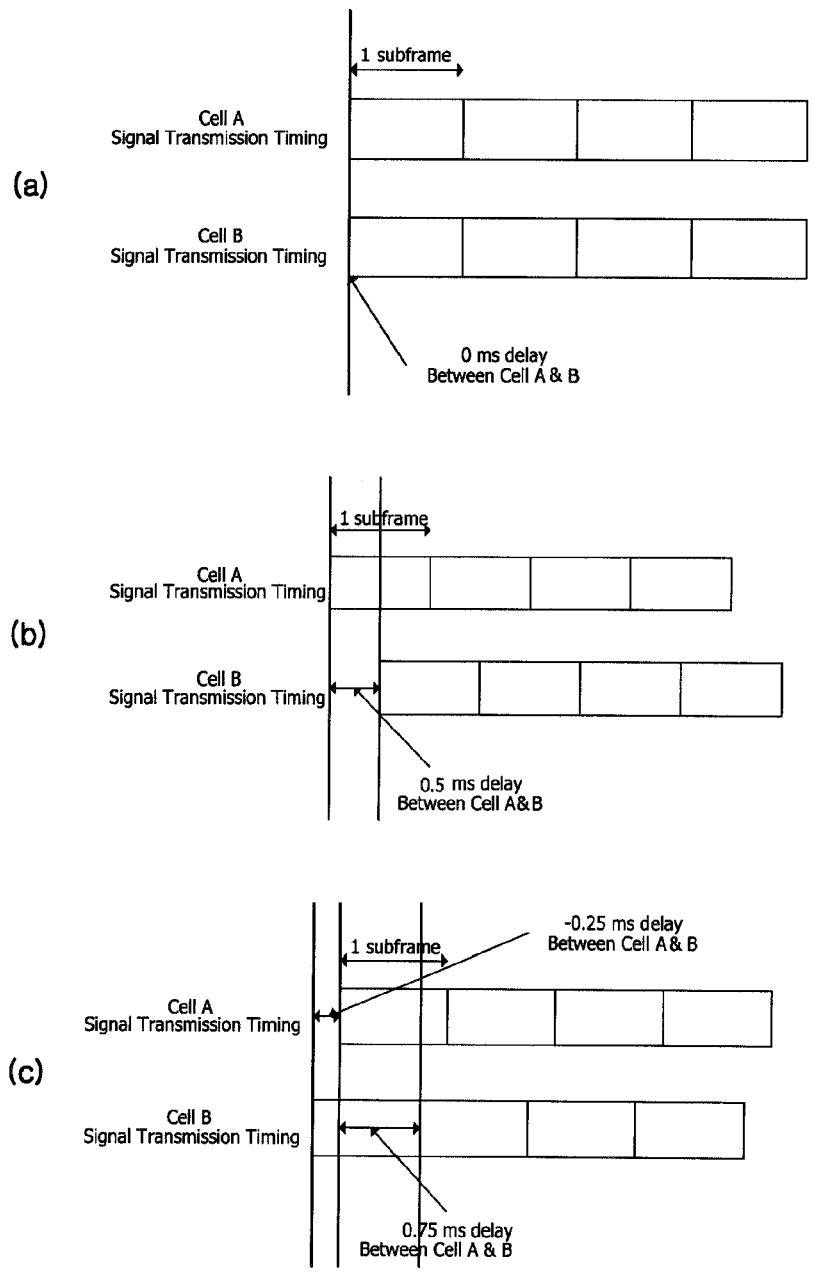
FIG. 4 illustrates one example of relative transmission time difference between two cells.
Figure 5:
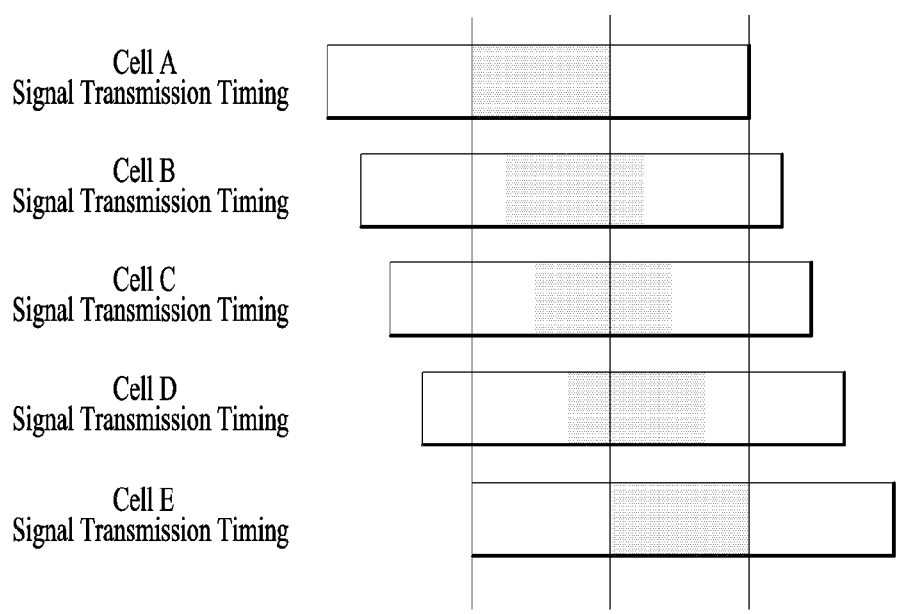
FIG. 5 illustrates one example of necessity of 3sub-frame to prevent interference from serving cell.

FIG. 4 illustrates one example of relative transmission time difference between two cells. FIG. 5 illustrates one example of necessity of 3 sub-frame to prevent interference from serving cell.

FIG. 4(a) shows the relative transmission time difference between two cells to be 0 ms. FIG. 4(b) shows the relative transmission time difference between two cells to be 0.5 ms. FIG. 4(b) shows the relative transmission time difference between two cells to be 0.75 ms, but from a different perspective this would result in negative 0.25 ms time difference.

For an any given serving cell to receive signal from a given target cell maximum 3 sub-frames would be need to be idled in order to receive the signal from a certain target cell without any interference from the serving cell.

So depending on the measurement signal transmission timing of the target cell and the idle subframe timing of the serving cell, there would be need to configure consecutive 1, 2, or 3 idle sub-frames.

So we can configure the network to have consecutive 1, 2 (or 3) idle subframe in the system, depending on the timing relationship between the serving cell and the measurement target cell(s). It can also possible for the UE to report the measured signal delay relative to the start of serving cell first idle subframe. This would allow the eNB a systematic way of calculating relative delay of the measured signal and limit the signal delay measurement to be within maximum of 3 ms.

In order for the UE take measurement without reading the subframe boundary or the radio frame boundary of the target cell, the serving cell can inform the UE of the target cell ID and approximate measurement subframe timing given in terms of subframe number and system frame number of the serving cell. Additionally the serving cell can inform the UE of the measurement signal bandwidth and frequency location of the measurement signal of the target cell. This would allow the UE to able to blindly detect the measurement signal without any target cell searching and target cell synchronization procedures.

The information needed to take measurement from the target cell can be broadcasted by the serving cell. This includes the actual target cell IDs. This is possible because the network is already geographically aware of the exact position of the eNBs. This enables the serving cell to be aware of the nearest cells around it, and also allows elimination of cells which do not contribute to delay measurement enhances such as cells with Tx antennas which are co-located with the serving cell (i.e. 3 sectors within the eNB).

FIG. 6

Figure 6:
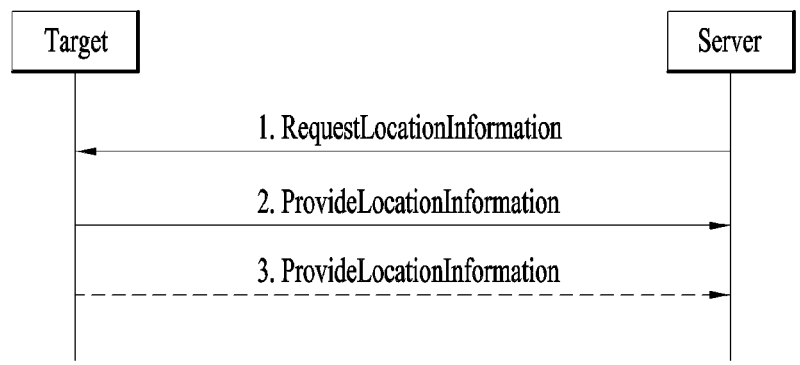
FIG. 6 illustrates one exemplary location transfer procedure.

FIG. 6 illustrates one exemplary location transfer procedure.

Referring to FIG. 6, the location information transfer procedure is shown.

1) First, the server sends a Request Location Information message to the target to request location information, indicating the type of location information needed and potentially the associated QoS.

2) The target sends a Provide Location Information message to the server to transfer location information. The location information transferred should match or be a subset of the location information requested in step 1 unless the server explicitly allows additional location information. This message may carry an end transaction indication.

3) The target sends additional Provide Location Information messages to the server to transfer location information. The location information transferred should match or be a subset of the location information requested in step 1 unless the server explicitly allows additional location information. The last message carries an end transaction indication.

Meanwhile, OTDOA-Neighbour Cell Info List can be sent by the network in order to facilitate measurement of PRS for other cells.

The IE OTDOA-Neighbour Cell Info List is used by the location server to provide neighbor cell information for OTDOA assistance data. The OTDOA-Neighbour Cell Info List is sorted according to best measurement geometry at the a priori location estimate of the target device. I.e., the target device is expected to provide measurements in increasing neighbor cell list order (to the extent that this information is available to the target device).

The Table 1 shows conditional presence of Neighbor cell information elements in ASN.1

TABLE 1

| Conditional presence | Explanation |
|---|---|
| NotsameAsRef0 | The field is mandatory present if the ARFCN is not the same as for the reference cell; otherwise it is not present. ARFCN is the carrier frequency value of the cell. |
| NotsameAsRef1 | The field is mandatory present if the cyclic prefix length is not the same as for the reference cell; otherwise it is not present. |
| NotsameAsRef2 | The field is mandatory present if the PRS configuration is not the same as for the reference cell; otherwise it is not present. |
| NotsameAsRef3 | The field is mandatory present if the antenna port configuration is not the same as for the reference cell; otherwise it is not present. |
| NotsameAsRef4 | The field is mandatory present if the slot timing is not the same as for the reference cell; otherwise it is not present. |
| InterFreq | The field is optionally present, need OP, if the ARFCN is not the same as for the reference cell; otherwise it is not present. |

Also, the Table 2 Shows OTDOA-Neighbor cell Information list field descriptions.

TABLE 2

OTDOA-NeighbourCellInfoList field descriptions physCellId This field specifies the physical cell identity of the neighbor cell
cellGlobalId This field specifies the ECGI, the globally unique identity of a cell in E-UTRA, of the neighbor cell, as defined in [12]. The server provides this field if it considers that it is needed to resolve any ambiguity in the cell identified by physCellId.
Earfcn This field specifies the ARFCN of the neighbor cell.
cpLength This field specifies the cyclic prefix length of the neighbor cell PRS.
prsInfo This field specifies the PRS configuration of the neighbor cell.
antennaPortConfig This field specifies whether 1 (or 2) antenna port(s) or 4 antenna ports for cell specific reference signals are used.
slotNumberOffset This field specifies the slot number offset between this cell and the reference cell. The offset corresponds to the number of full slots counted from the beginning of a radio frame of the reference cell to the beginning of the closest subsequent radio frame of this cell. The offset is used to determine the neighbor cell slot number which is used for generation of reference signal sequence as defined in [16]. If this field is absent, the slot timing is the same as for the reference cell.
prs-SubframeOffset This field specifies the offset between the first PRS subframe in the reference cell on the reference carrier frequency layer and the first PRS subframe in the closest subsequent PRS burst of the other cell on the other carrier frequency layer. The value is given in number of full sub-frames. If the ARFCN is not the same as for the reference cell and the field is not present, the receiver shall consider the PRS subframe offset for this cell to be 0.
expectedRSTD This field indicates the RSTD value that the target device is expected to measure between this cell and the reference cell in OTDOAReferenceCellInfo. The RSTD value can be negative and is calculated as (expectedRSTD-8192). The resolution is 3 $T_s$, with $T_s = 1/(15000 * 2048)$ seconds.
expectedRSTD-Uncertainty This field indicates the uncertainty in expectedRSTD value. The uncertainty is related to the location server s a-priori estimation of the target device location. The expectedRSTDUncertainty defines the following search TABLE 2-continued OTDOA-NeighbourCellInfoList field descriptions window for the target device:[expectedRSTD? expectedRSTD-Uncertainty] < measured RSTD < [expectedRSTD ??expectedRSTD-Uncertainty]The scale factor of the expectedRSTD-Uncertainty field is 3 $T_s$, with $T_s = 1/(15000 * 2048)$ seconds.

Meanwhile, configuration of Positioning RS (PRS) will be explained below.

The cell specific sub-frame configuration period $T_{PRS}$ and the cell specific sub-frame offset $\Delta_{PRS}$ for the transmission of positioning reference signals are listed in Table 3 below. The PRS configuration index $I_{PRS}$ is configured by higher layers. Positioning Reference Signals (PRSs) are transmitted only in configured DL sub-frames. PRSs are not transmitted in special sub-frames. PRSs are transmitted in $N_{PRS}$ consecutive downlink sub-frames, where $N_{PRS}$ is configured by higher layers.

The positioning reference signal instances, for the first sub-frame of the $N_{PRS}$ downlink sub-frames, satisfy $(10 \times n_f + \lfloor n_s/2 \rfloor - \Delta_{PRS}) \bmod T_{PRS} = 0$.

Table3 shows sub-frame configuration of the PRS.

TABLE 3

| PRS periodicity $T_{PRS}$ (sub-frames) |
|---|
| [160] |
| [320] |
| [640] |
| [1280] |
| [Reserved] |

Meanwhile, measurements of Positioning RS will be explained below.

When the physical layer cell identities of neighbor cells together with the OTDOA assistance data are provided, the UE is able to detect and measure intra-frequency RSTD, specified in 3GPP TS 36.214, for at least n=16 cells, including the reference cell, on the same carrier frequency fl as that of the reference cell within $T_{RSTD}$ ms as given below:

$$T_{RSTD} = T_{RSTD} \cdot (M-1) + \Delta ms,$$

where $T_{RSTD}$ is the total time for detecting and measuring at least n cells, $T_{PRS}$ is the cell-specific positioning sub-frame configuration period as defined in 3GPP TS 36.211, M is the number of PRS positioning occasions as defined in Table below, where each PRS positioning occasion comprises of $N_{PRS}$ ($1 \leq N_{PRS} \leq 6$) consecutive downlink positioning sub-frames defined in 3GPP TS 36.211, and $$\Delta = 160 \cdot \left\lceil \frac{n}{M} \right\rceil$$

ms is the measurement time for a single PRS positioning occasion which includes the sampling time and the processing time.

Table 4 shows number of PRS positioning occasions within $T_{RSTD}$

TABLE 4

| Positioning sub-frame configuration period $T_{PHS}$ |
|---|
| 160 ms |
| >160 ms |

The UE physical layer is capable of reporting RSTD for the reference cell and all the neighbor cells i out of at least (n−1) neighbor cells within provided:

(PRS $\hat{E}_s$/Iot)$_{ref \geq -6\ dB}$ for all Frequency Bands for the reference cell, (PRS $\hat{E}_s$/Iot)$_{i \geq -13\ dB}$ for all Frequency Bands for neighbour cell i, (PRS $\hat{E}_s$/Iot)$_{ref}$ and (PRS $\hat{E}_s$/Iot)$_i$ conditions apply for all sub-frames of at least L=M/2 PRS positioning occasions, PRP 1,2|dBm≥−127 dBm for Frequency Bands 1, 4, 6, 10, 11, 18, 19, 21, PRP 1,2|dBm≥−126 dBm for Frequency Bands 9, PRP 1,2|dBm≥−125 dBm for Frequency Bands 2, 5, 7, PRP 1,2|dBm≥−124 dBm for Frequency Bands 3, 8, 12, 13, 14, 17, 20.

PRS $\hat{E}_s$/Iot is defined as the ratio of the average received energy per PRS RE during the useful part of the symbol to the average received power spectral density of the total noise and interference for this RE, where the ratio is measured over all REs which carry PRS.

The time $T_{RSTD}$ starts from the first sub-frame of the PRS positioning occasion closest in time after the OTDOA assistance data in the OTDOA-ProvideAssistanceData message as specified in 3GPP TS 36.355, is delivered to the physical layer of the UE as illustrated in figure below.

The RSTD measurement accuracy for all measured neighbor cells i shall be fulfilled according to the accuracy requirements.

FIG. 7

Figure 7:
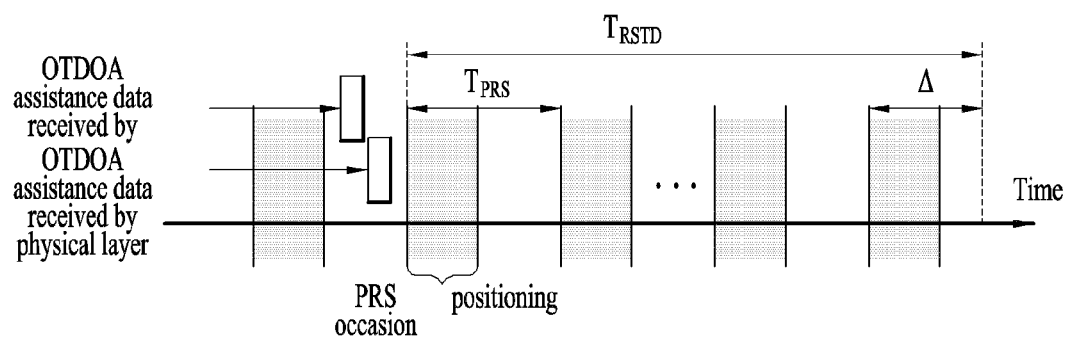
FIG. 7 illustrates a RSTD reporting time requirement in an FDD mode.

FIG. 7 illustrates a RSTD reporting time requirement in an FDD mode.

As shown in FIG. 7, the measurement report is not delayed by other LPP signaling on the DCCH. This measurement reporting delay excludes a delay uncertainty resulted when inserting the measurement report to the TTI of the uplink DCCH. The delay uncertainty is: 2×TTIDCCH. This measurement reporting delay excludes any delay caused by no UL resources for UE to send the measurement report.

Table 5 shows a reference signal time difference (RSTD)

TABLE 5

| Definition | The relative timing difference between cell j and cell i, defined as $T_{Sub-frameRxj} - T_{Sub-frameRxi}$, where: $T_{Sub-frameRxj}$ is the time when the UE receives the start of one sub-frame from cell j $T_{sub-frameRxi}$ is the time when the UE receives the corresponding start of one sub-frame from cell i that is closest in time to the sub-frame received from cell j. The reference point for the observed sub-frame time difference shall be the antenna connector of the UE. |
|---|---|

TABLE 5-continued

| Applicable for | RRC_CONNECTED intra-frequency RRC_CONNECTED inter-frequency |
|---|---|

The Table 6 shows accuracies required for the RSTD measurement performed by the UE, according to the bandwidth allocated for PRS by the neighbor cell. The accuracies in Table 6 are valid under the following conditions:

Conditions defined in 36.101 Section 7.3 for reference sensitivity are fulfilled.

PRP 1,2|dBm≥−127 dBm for Bands 1, 4, 6, 10, 11, 18, 19, 21, 33, 34, 35, 36, 37, 38, 39, 40, PRP 1,2|dBm≥−126 dBm for Band 9, PRP 1,2|dBm≥−125 dBm for Bands 2, 5, 7, PRP 1,2|dBm≥−124 dBm for Bands 3, 8, 12, 13, 14, 17, 20.

There are no measurement gaps overlapping with the PRS sub-frames of the measured cell.

The parameter expected RSTD Uncertainty signaled over LPP by E-SMLC as defined in 3GPP TS 36.355 is less than 5 µs.

TABLE 6

| | | | | | Conditions | | | |
|---|---|---|---|---|---|---|---|---|
| Parameter | PRS Transmission Bandwidth [RB] | Number of Sub-frames Available for Measurements | Unit | Accuracy [Ts] | Bands 1, 4, 6, 10, 11, 18, 19, 21, 33, 34, 35, 36, 37, 38, 39 & 40 Io | Bands 2, 5, 7, 17 Io | Bands 3, 8, 12, 13, 14, 20 Io | Band 9 Io |
| RSTD for (PRS $\hat{E}s$/Iot)$_{ref}$ ≥ −6 dB and (PRS $\hat{E}s$/Iot)$_i$ ≥ −13 dB | 6, 15 25 50, 75, 100 | 6 ≥2 ≥1 | $T_s$ | ±15 ±6 ±5 | −121 dBm/15 kHz . . . −50 dBm/ BW$_{Channel}$ | −119 dBm/15 kHz . . . −50 dBm/ BW$_{Channel}$ | −118 dBm/15 kHz . . . −50 dBm/ BW$_{Channel}$ | −120 dBm/15 kHz . . . −50 dBm/ BW$_{Channel}$ |

Note 1:
Io is assumed to have constant EPRE across the bandwidth.
Note 2:
Ts is the basic timing unit defined in 3GPP TS 36.211.

The Table 7 shows a relationship between a bandwidth and a number of resource blocks (RBs).

TABLE 7

| | Bandwidth [MHz] | | | | | |
|---|---|---|---|---|---|---|
| | 1.4 | 3 | 5 | 10 | 15 | 20 |
| RB | 6 | 15 | 25 | 50 | 75 | 100 |

FIG. 8

Figure 8:
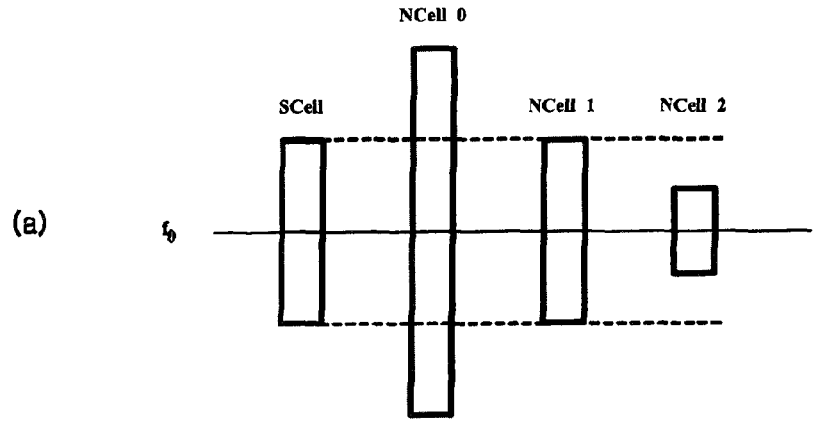
FIG. 8 illustrates one example of a case where a bandwidth allocated by the serving cell is different from bandwidths allocated by at least one or more neighbor cells.
Figure 8:
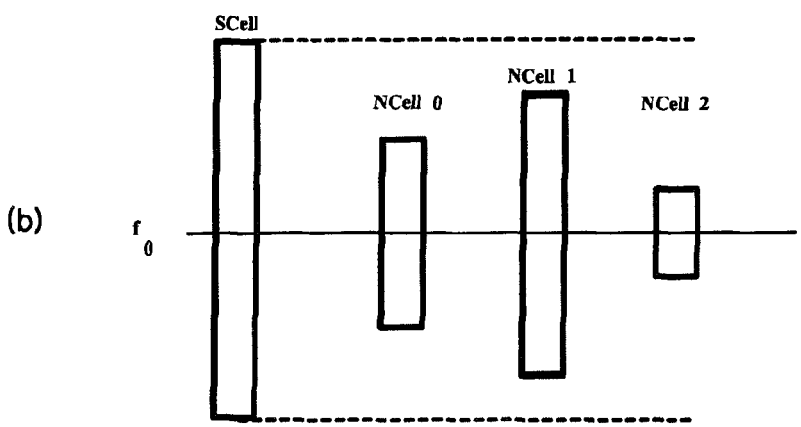

FIG. 8 illustrates one example of a case where a bandwidth allocated by the serving cell is different from bandwidths allocated by at least one or more neighbor cells.

Referring to FIG. 8(a), if a UE which belongs to a serving cell having allocated a 3 MHz bandwidth tries to receive a PRS from a target cell having allocated a 10 Mhz bandwidth for the PRS, the accuracy of the measurement is changed from ±15 Ts to ±5 Ts. In other words, the accuracy will be very tight.

Referring to FIG. 8(b), if the bandwidth allocated for the PRS by the serving cell greater than the bandwidth allocated for the PRS by the neighbor cell, when the UE tries to receive the PRS from the neighbor cell, the UE could receive an unwanted interference via the bandwidth of the serving cell greater than the bandwidth of the neighbor cell. Such the interference sometimes causes the accuracy to be degraded.

Figure 9:
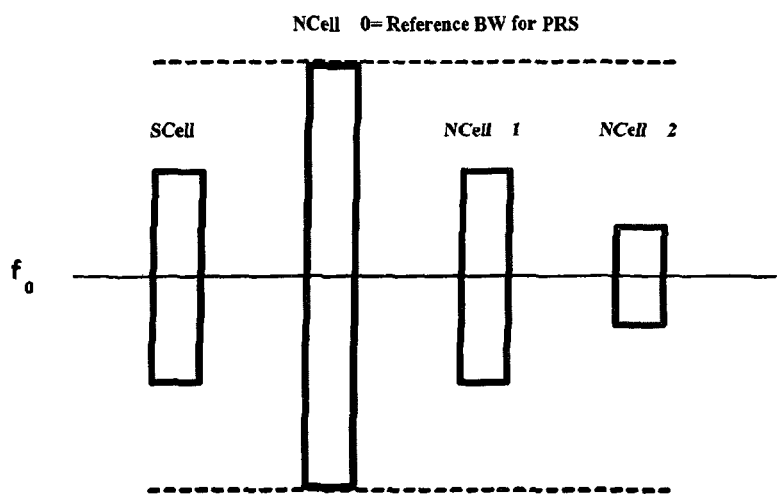
FIG. 9 illustrates a first embodiment of the present invention in which the longest BW in the serving cell and the neighboring cells is considered to measure the PRS.
Figure 10:
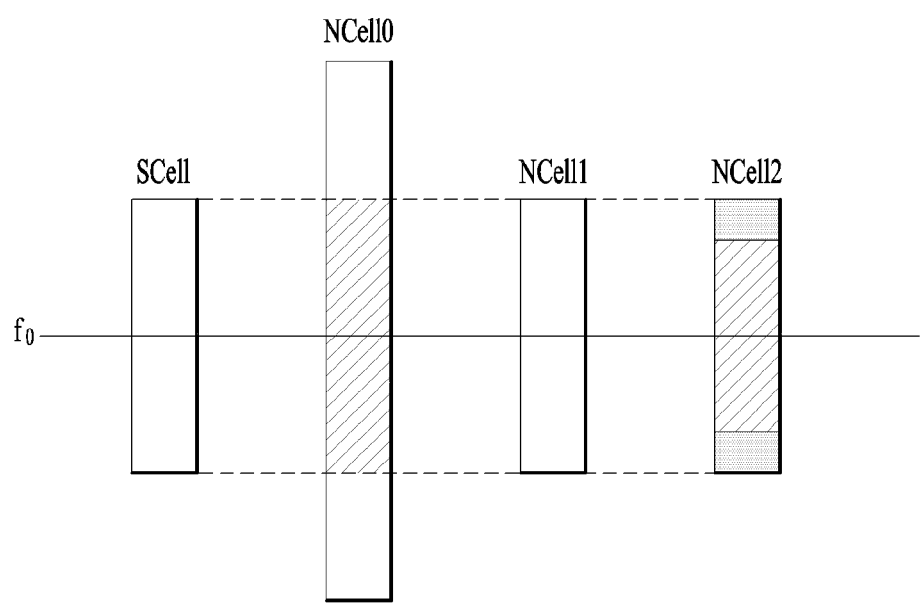
FIG. 10 illustrates a second embodiment of the present invention in which a bandwidth of the first cell is adjusted thereby to be equal to a bandwidth of the other cell.
Figure 11:
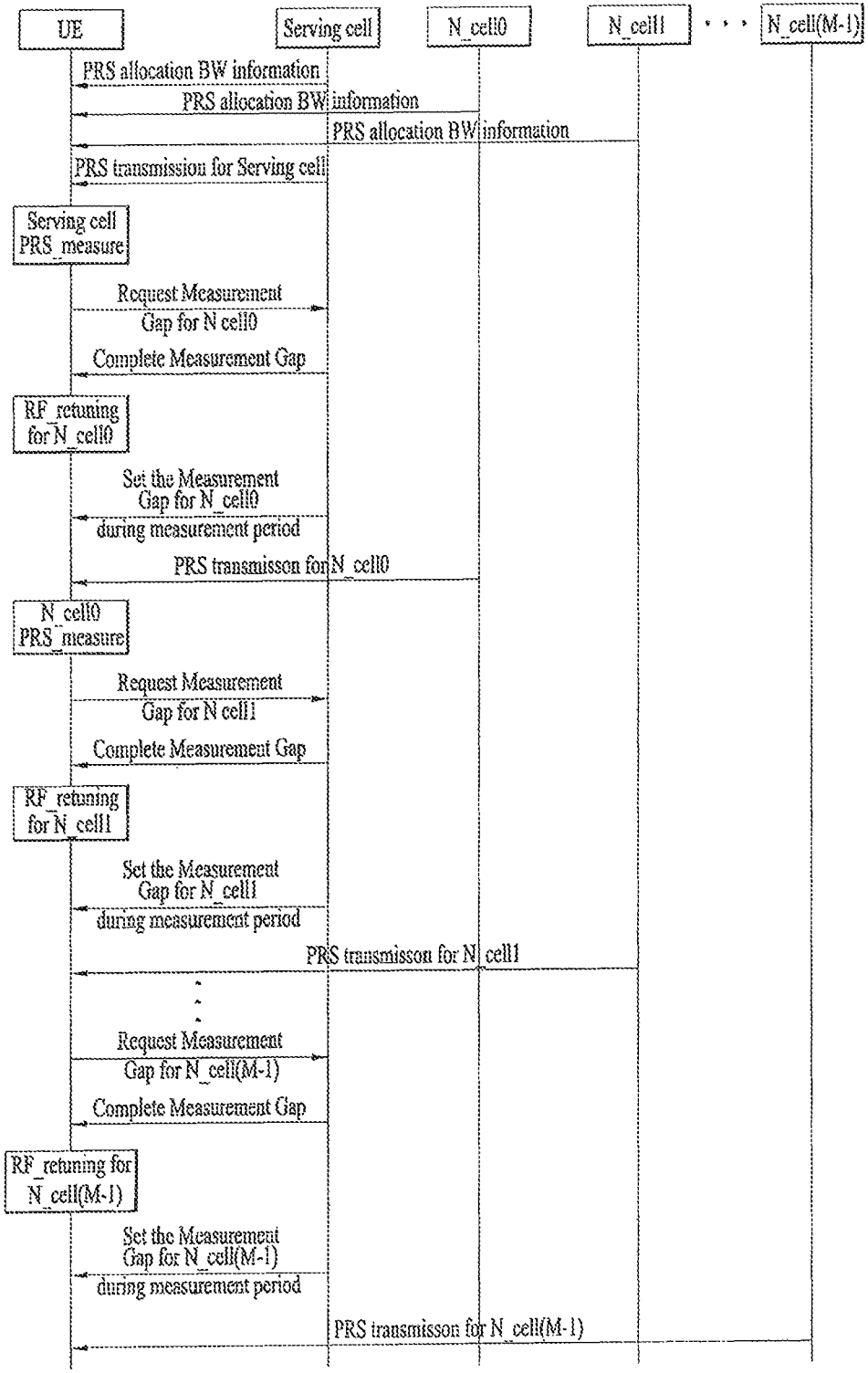
FIG. 11 illustrates a third embodiment of the present invention.

Therefore, hereinafter, techniques to satisfy the requirement of the accuracy for measuring RTSD between neighbor cells, which have a relationship based on intra-frequency, will be described FIG. 9 to FIG. 11 illustrates three embodiments of the present invention to increase the accuracy.

FIG. 9

FIG. 9 illustrates a first embodiment of the present invention in which the longest BW in the serving cell and the neighboring cells is considered to measure the PRS.

Referring to FIG. 9, the first embodiment allows the UE to measure a Reference Signal Timing difference (RSTD) by using information on a bandwidth allocated for the PRS by at least one neighbor cell, if the bandwidth allocated for the PRS by the neighbor cell is greater than a bandwidth allocated for the PRS by a serving cell.

Generally, an accuracy of the measurement is varied dependent on a bandwidth allocated for the PRS. And, the greater is the bandwidth allocate for the PRS, the greater is the frequency sample rate thereby to acquire an excellent accuracy of the measurement.

The UE can obtain information on the bandwidths allocated for PRS by at least one neighbor cells by receiving an RRC signal message. Therefore, the UE can select at least one cell having the greatest bandwidth among the serving cell at least one neighbor cell. And the UE considers the selected cell as a reference cell. And, the UE sets, based on the biggest bandwidth, at least one parameter for measuring the timing difference between PRSs. The parameter includes at least one of a first parameter related to an accuracy with respect to the measurement, and a second parameter related to the number of sub-frames available for the measurement. And then the UE measures the RSTD between PRSs transmitted from the serving cell and the neighbor cell according to the set parameter.

In other words, as shown in FIG. 9, the UE does not consider the serving cell as a reference cell, if a bandwidth of the serving cell is not a greatest. Rather, as shown in FIG. 9, the UE measures the PRS according to the greatest bandwidth allocated for PRS thereby to obtain an excellent accuracy.

However, if the UE tries to receive PRSs from the serving cell and the neighbor cell which allocates a smaller bandwidth than the greatest bandwidth, an interference signal may also be received by the UE. But, since the UE already acquires information on bandwidth allocated by each cell, the UE can minimize the interference signal by using a digital filter.

As described until now, the first embodiment makes it possible to satisfy the requirement for the accuracy of the measurement.

FIG. 10

FIG. 10 illustrates a second embodiment of the present invention in which a bandwidth of the first cell is adjusted thereby to be equal to a bandwidth of the other cell.

Referring to FIG. 10, the second embodiment allows the serving cell and the neighbor cell to allocate the same bandwidth for the PRS. To do this, the serving cell may exchanges information on the bandwidth allocated for the PRS with the neighbor cells. After receiving the information, each neighbor cell adjusts an allocation of the bandwidth.

In more detail, the serving cell and the neighbor cell exchanges the information via an X2 interface. Alternatively, an operator may request the serving cell and the neighbor cell to allocate the same bandwidth by using a Operation & Management (O&M) protocol.

FIG. 11 & FIG. 12

Figure 12:
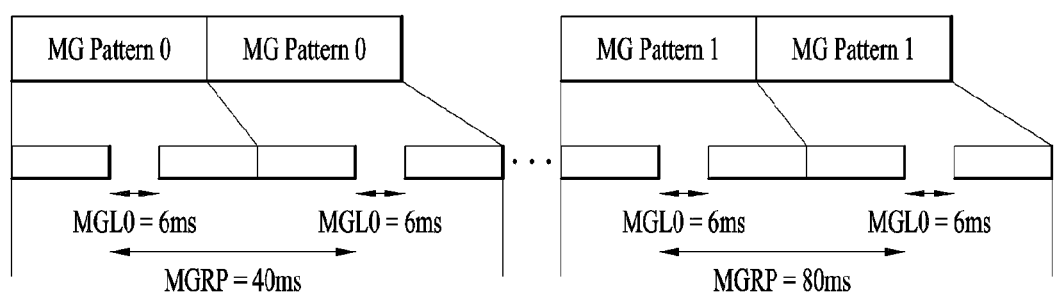
FIG. 12 illustrates one example of a measurement gap according to the third embodiment of the present invention

FIG. 11 illustrates a third embodiment of the present invention. And, FIG. 12 illustrates one example of a measurement gap according to the third embodiment of the present invention Referring to FIG. 11, the third embodiment allows the UE to sequentially receive a plurality of PRSs.

In more detail, if a bandwidth allocated for a PRS received from one cell is smaller or greater than the bandwidth allocated by the serving cell, the UE has to tune a RF component in order to receive a corresponding PRS in each bandwidth. But such tuning requires a time. Therefore, the serving cell provides a time gap to the UE such that the UE has a enough time to tune it's RF component. To do this, the serving cell can not transmit any signals when the UE has to receive a corresponding PRS from each neighbor cell.

For this, the UE transmits a request message for requesting a gap to the serving cell. The request message includes information on bandwidths allocated by at least one neighbor cell.

Meanwhile, the UE adaptively or actively controls it's filter in order to receive a PRS in a corresponding bandwidth allocated by each cell such that the UE can measures a RSTD between PRSs having a relationship based on intra-frequency.

Table7 shows a pattern of the gap for the measurement. This gap is also used to monitor inter-frequency EARFCN and inter-RAT system. The gap supports 40 ms and 80 ms. Also, a measurement period may be 6 ms.

TABLE 8

| Gap Pattern Id | Measurement Gap Length (MGL, ms) | Measurement Gap Repetition Period (MGRP, ms) | Minimum available time for inter-frequency and inter-RAT measurements during 480 ms period(Tinter1, ms) | Measurement Purpose |
|---|---|---|---|---|
| 0 | 6 | 40 | 60 | Inter-Frequency E-UTRAN FDD and TDD, UTRAN FDD, GERAN, LCR TDD, HRPD, CDMA2000 1x |
| 1 | 6 | 80 | 30 | Inter-Frequency E-UTRAN FDD and TDD, UTRAN FDD, GERAN, LCR TDD, HRPD, CDMA2000 1x |

In actual, in order to measure RSTD between PRSs, it is required to set the measurement gap in a physical layer. And, if the measurement gap is set, the measurement is performed in an optimal way. Referring to FIG. 12, the measurement gap exists between sub-frames in which the serving cell has to transmit data.

FIG. 13 & FIG. 14

Figure 13:
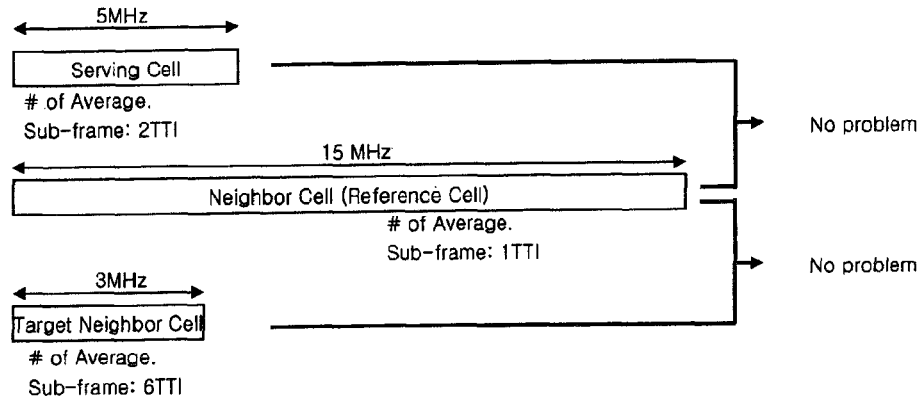
FIG. 13 illustrates a case where the serving cell is not defined as a reference cell and the bandwidth allocated by the serving cell is greater than the bandwidth allocated by the target cell.
Figure 14:
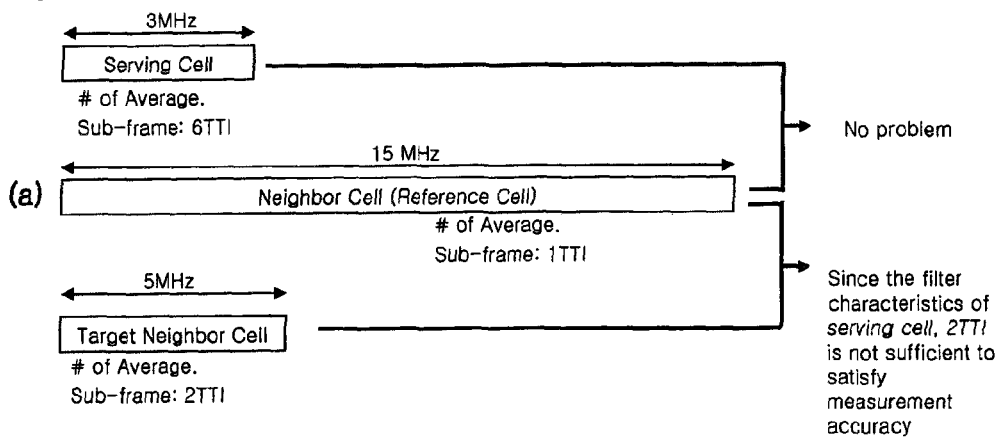
FIG. 14 illustrates a problem to be occurred in a case where the serving cell is not defined as a reference cell and the bandwidth allocated by the serving cell is smaller than the bandwidth allocated by the target cell and a solution according to the fourth embodiment.
Figure 14:
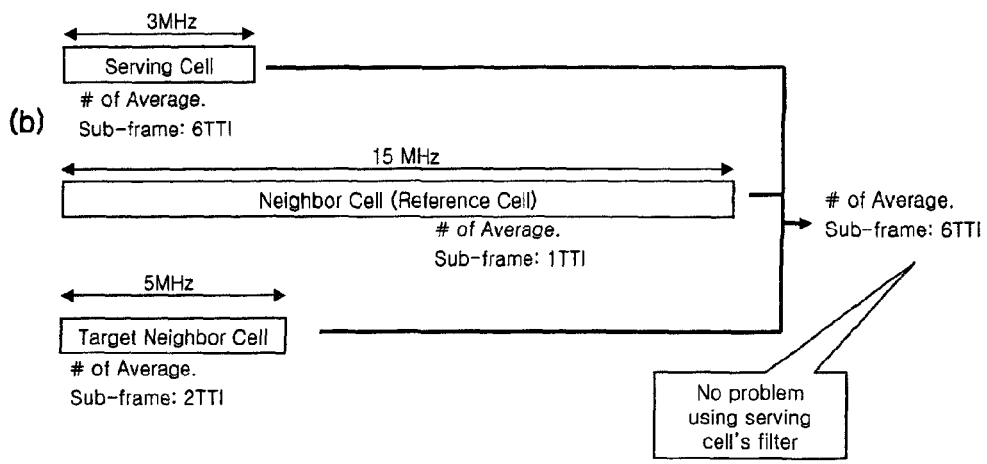

FIG. 13 illustrates a case where the serving cell is not defined as a reference cell and the bandwidth allocated by the serving cell is greater than the bandwidth allocated by the target cell. And, FIG. 14 illustrates a problem to be occurred in a case where the serving cell is not defined as a reference cell and the bandwidth allocated by the serving cell is smaller than the bandwidth allocated by the target cell and a solution according to the fourth embodiment.

Referring FIG. 13, the serving cell allocates a 5 MHz bandwidth for the PRS and a neighbor cell which is defined as a reference cell allocates a 15 MHz bandwidth, and also a target cell allocates a 3 MHz bandwidth. Here, referring to Table 7, 3 MHz corresponds to a 15 RBs, 5 MHz corresponds to a 25 RBs, and 15 MHz corresponds to a 75 RBs. Also, referring to Table 6, if the bandwidth is 15 RBs, the number of sub-frames required for the measurement is 6. And, if the bandwidth is 25 RBs, the number of subframes is 2. And also, if the bandwidth is 75 RBs, the number of sub-frames is 1.

Therefore, the PRS transmitted from the serving cell is measured during 2 sub-frames (or 2 TTI). And, the PRS transmitted from the reference cell is measured during 1 subframe. And also, the PRS transmitted from the target cell is measured during 1 subframe.

Meanwhile, if the UE uses a filter to be tuned for the 5 MHz bandwidth of the serving cell, determines the number of sub-frames based on the smaller one from among the bandwidth of the target cell and the bandwidth of the reference cell (in other words, the UE selects 6 sub-frames), and measures the RSTD between the PRSs transmitted from the serving cell and the target cell in reference to the PRS transmitted from the reference cell during the determined number of sub-frames, then there is no problem, since the measurement is performed during the 6 sub-frames which are enough long time to receive the PRS transmitted from the serving cell and since the filter is tuned for the 5 MHz greater than the 3 MHz of the target cell.

However, referring to FIG. 14(a), the serving cell is not defined as a reference cell and the bandwidth allocated by the serving cell is smaller than the bandwidth allocated by the target cell.

In such a case, if the UE uses a filter to be tuned for the 3 MHz bandwidth of the serving cell, selects the number of sub-frames based on the smaller one from among the bandwidth of the reference cell and the bandwidth of the target cell (in other words, the UE selects 2 sub-frames), and measures the RSTD between the PRSs transmitted from the serving cell and the target cell based on the PRS transmitted from the reference cell during the determined number of sub-frames, then there is a problem, since the measurement performed during only the 2 sub-frames is not sufficient to satisfy the accuracy in a condition where the filter is tuned for the 3 MHz smaller than the 5 MHz of the target cell. In other words, since the PRS on 5 MHz transmitted from the target cell passes through the filter tuned for the 3 MHz, the original 2 sub-frames are not enough.

To solve this problem, FIG. 14(b) shows a solution according to the fourth embodiment. The fourth embodiment allows the UE to determine the number of subframes based on the smallest bandwidth in all the cells including the serving cell, the reference cell and the target cell.

In more detail, FIG. 14(b) shows one example case where the serving cell allocates a 3 MHz bandwidth for the PRS and the target cell allocates the 5 MHz bandwidth.

In such a case, if the UE uses a filter to be tuned for the 3 MHz bandwidth of the serving cell, determines the number of sub-frames based on the smallest bandwidth in all the cells including the serving cell, the reference cell and the target cell (in other words, the UE selects 6 sub-frames), and measures the RSTD between the PRSs transmitted from the serving cell and the target cell based on the PRS transmitted from the reference cell during the determined number of sub-frames (i.e., during 6 subframes), then there is no problem, since the measurement is performed during the 6 sub-frames which are enough long time to receive the PRS transmitted from the target cell although the filter is tuned for the 3 MHz smaller than the 5 MHz of the target cell.

Meanwhile, according to the fourth embodiment, the UE transmits information on a parameter related to the determined number of the sub-frames to the serving cell.

The method according to the present invention as described above may be implemented by software, hardware, or a combination of both. For example, the method according to the present invention may be stored in a storage medium (e.g., internal memory, flash memory, hard disk, and so on), and may be implemented through codes or instructions in a software program that can be performed by a processor such as microprocessor, controller, micro controller, ASIC (application specific integrated circuit), and the like. Hereinafter, it will be described with reference to FIG. 11.

FIG. 15

Figure 15:
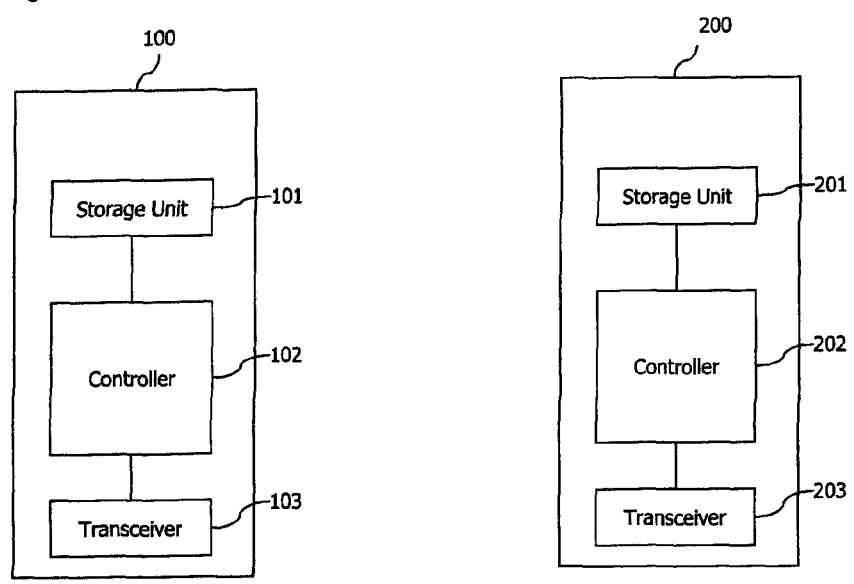
FIG. 15 is a configuration block diagram illustrating the UE 100 and a base station 200 according to the present invention.

FIG. 15 is a configuration block diagram illustrating the UE 100 and a base station 200 according to the present invention.

As illustrated in FIG. 15, the UE 100 may include a storage unit 101, a transceiver 103, and a controller 102. Also, the base station 200 may include a storage unit 201, a transceiver 203, and a controller 202. The base station 200 may be the serving cell, the reference cell, or the target cell.

The storage units store a software program implementing the foregoing method as illustrated in FIGS. 1 through 14. Also, the storage units store information within each of the received messages (or signals).

Each of the controllers controls the storage units and the transceivers, respectively.

Specifically, the controllers implements the foregoing methods, respectively, stored in each of the storage units.

The present invention has been explained with reference to the embodiments which are merely exemplary. It will be apparent to those skilled in the art that various modifications and equivalent other embodiments can be made in the present invention without departing from the spirit or scope of the invention. Also, it will be understood that the present invention can be implemented by selectively combining the aforementioned embodiment(s) entirely or partially. Thus, it is intended that the present invention cover modifications and variations of this invention provided they come within the scope of the appended claims and their equivalents.

What is claimed is:

1. A method for measuring an observed time difference of arrival (OTDOA), the method performed by a terminal and comprising:
   acquiring information on a first bandwidth allocated for PRSs (Positioning Reference Signals) of a serving cell;
   acquiring information on a second bandwidth allocated for PRSs of a neighbour cell;
   acquiring information on a third bandwidth allocated for PRSs of a reference cell; and
   measuring a RSTD (Reference Signal Time Difference) which is a relative timing difference between the neighbour cell and the reference cell, with a RSTD measurement accuracy,
   wherein the RSTD measurement accuracy is determined based on a number of available measurement subframes and a minimum bandwidth among the first bandwidth of the serving cell, the second bandwidth of the neighbour cell and the third bandwidth of the reference cell.

2. The method of claim 1, further comprising:
   receiving, from a server, a request location information message for requesting information indicating a type of location information; and
   transmitting, a provide location information message in response to the request location information message to the server.

3. The method of claim 2, wherein the provide location information message includes a positioning measurements.

4. The method of claim 1, further comprising:
   receiving an OTDOA assistance data message including a cell identity of the neighbour cell.

5. The method of claim 4, wherein the OTDOA assistance data further includes information on the second bandwidth and the third bandwidth.

6. The method of claim 4, wherein the OTDOA assistance data includes at least one of:
   information on an antenna port configuration indicating a number of antenna ports for cell specific reference signals;
   information on slot number offset between the neighbour cell and the reference cell;
   information on sub-frame offset of PRS between a first PRS subframe of the reference cell and a first PRS subframe of the neighbour cell.

7. The method of claim 4, wherein the OTDOA assistance data includes at least one of:
   a first field related to a RSTD value that the terminal is expected to measure between cells, and
   a second field related to an uncertainty in the RSTD value.

8. A user equipment for measuring an observed time difference of arrival (OTDOA), the user equipment comprising:
   a transceiver to transceive signals; and
   a controller which is configured to:
      acquire information on a first bandwidth allocated for PRSs (Positioning Reference Signals) of a serving cell,
      acquire information on a second bandwidth allocated for PRSs of a neighbour cell,
      acquire information on a third bandwidth allocated for PRSs of a reference cell, and
      measuring a RSTD (Reference Signal Time Difference), which is a relative timing difference between the neighbour cell and the reference cell, with a RSTD measurement accuracy,
   wherein the RSTD measurement accuracy is determined based on a number of available measurement subframes and a minimum bandwidth among the first bandwidth of the serving cell, the second bandwidth of the neighbour cell and the third bandwidth of the reference cell.

9. The user equipment of claim 8, wherein the controller is further configured to:
   receiving, from a server, a request location information message for requesting information indicating a type of location information; and
   transmitting, a provide location information message in response to the request location information message to the server.

10. The user equipment of claim 9, wherein the provide location information message includes a positioning measurements.

11. The user equipment of claim 8, wherein the controller is further configured to:
   receiving an OTDOA assistance data message including a cell identity of the neighbour cell.

12. The user equipment of claim 11, wherein the OTDOA assistance data further includes information on the second bandwidth and the third bandwidth.

13. The user equipment of claim 11, wherein the OTDOA assistance data includes at least one of:
   information on an antenna port configuration indicating a number of antenna ports for cell specific reference signals;
   information on slot number offset between the neighbour cell and the reference cell;
   information on sub-frame offset of PRS between a first PRS subframe of the reference cell and a first PRS subframe of the neighbour cell.

14. The user equipment of claim 11, wherein the OTDOA assistance data includes at least one of:
   a first field related to a RSTD value that the terminal is expected to measure between cells, and
   a second field related to an uncertainty in the RSTD value.

* * * * *